US010252461B2

(12) United States Patent
Agrawal et al.

(10) Patent No.: US 10,252,461 B2
(45) Date of Patent: Apr. 9, 2019

(54) COGNITIVE-BASED DRIVING ANOMALY DETECTION BASED ON SPATIO-TEMPORAL LANDSCAPE-SPECIFIC DRIVING MODELS

(71) Applicant: International Business Machines Corporation, Armonk, NY (US)

(72) Inventors: Priyanka Agrawal, Bangalore (IN); Pankaj Dayama, Bangalore (IN); Amrita Saha, Bangalore (IN); Srikanth G. Tamilselvam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/469,937

(22) Filed: Mar. 27, 2017

(65) Prior Publication Data
US 2018/0274934 A1 Sep. 27, 2018

(51) Int. Cl.
*G06Q 40/08* (2012.01)
*G06Q 50/14* (2012.01)
(Continued)

(52) U.S. Cl.
CPC ........ *B29C 61/003* (2013.01); *B29K 2023/00* (2013.01)

(58) Field of Classification Search
CPC ........ G01C 21/34; G08G 1/123; G08G 1/017; G06Q 20/102; G06Q 50/30; G06Q 50/14;
(Continued)

(56) References Cited

U.S. PATENT DOCUMENTS 8,478,514 B2    7/2013 Kargupta
8,498,953 B2 *  7/2013 Lehmann ............... G06Q 50/14
                                                  705/7.12
(Continued)

FOREIGN PATENT DOCUMENTS

CN    201374086 Y    12/2009
CN    203237054 U    10/2013
(Continued)

OTHER PUBLICATIONS

Peter Mell et al. The NIST Definition of Cloud Computing, Recommendations of the National Institute of Standards and Technology, U.S. Department of Commerce, Special Publication 800-145, Sep. 2011, 7 pages.
(Continued)

*Primary Examiner* — Yuri Kan
(74) *Attorney, Agent, or Firm* — Ryan, Mason & Lewis, LLP (57) ABSTRACT

Methods, systems, and computer program products for driving anomaly detection based on spatio-temporal landscape-specific driving models are provided herein. A method includes generating, for each of multiple users, a temporally-related driving skill model pertaining to one or more landscapes, wherein the model is based on temporally-related driving data associated with the users and landscape-related information of trips driven by the users; monitoring the users participating in a ride-sharing trip in a vehicle by analyzing ride-sharing trip data; detecting driving-related anomalies attributed to the monitored users by comparing the ride-sharing trip data and the respective temporally-related driving skill model for each monitored user; updating a schedule for the trip based on the detected anomalies and estimated conditions attributed to remaining portions of the trip by modifying an assignment of selected users to drive the
(Continued)

vehicle during the remaining portions of the trip; and outputting the updated schedule to the selected users.

20 Claims, 8 Drawing Sheets

(51) Int. Cl.
*B29C 61/00* (2006.01)
*B29K 23/00* (2006.01)

(58) Field of Classification Search
CPC .... G06Q 40/08; G06K 9/6202; G06F 21/316; G06F 9/445; G06F 17/00; H04L 29/06; B29C 61/003
See application file for complete search history.

(56) References Cited

U.S. PATENT DOCUMENTS

| | | | | |
|---|---|---|---|---|
| 8,949,823 | B2* | 2/2015 | Ricci | G06F 13/14 |
| | | | | 717/168 |
| 9,070,088 | B1* | 6/2015 | Baveja | G06F 21/316 |
| 9,127,958 | B2 | 9/2015 | Lehmann et al. | |
| 9,723,469 | B2* | 8/2017 | Truong | H04W 4/029 |
| 2011/0202393 | A1* | 8/2011 | DeWakar | G06Q 20/102 |
| | | | | 705/13 |
| 2013/0079964 | A1* | 3/2013 | Sukkarie | G01C 21/3469 |
| | | | | 701/22 |
| 2014/0108198 | A1* | 4/2014 | Jariyasunant | G06Q 40/08 |
| | | | | 705/26.35 |
| 2014/0173511 | A1 | 6/2014 | Lehmann et al. | |
| 2015/0006072 | A1* | 1/2015 | Goldberg | G06Q 50/30 |
| | | | | 701/408 |
| 2016/0035152 | A1 | 2/2016 | Kargupta | |
| 2016/0054736 | A1* | 2/2016 | Kolhouse | G08G 1/017 |
| | | | | 701/96 |
| 2017/0200061 | A1* | 7/2017 | Julian | G06K 9/6202 |

FOREIGN PATENT DOCUMENTS

| | | |
|---|---|---|
| CN | 203338413 U | 12/2013 |
| CN | 203350911 U | 12/2013 |
| EP | 2624178 A1 | 8/2013 |
| WO | 2016028228 A1 | 2/2016 |

OTHER PUBLICATIONS

Agamennoni et al. Anomaly Detection in Driving Behaviour by Road Profiling, IEEE, 2013.
He et al. WhozDriving: Abnormal Driving Trajectory Detection by Studying Multi-faceted Driving Behavior Features. Big Data Computing and Communications, vol. 9784 of the series Lecture Notes in Computer Science pp. 135-144, 2016.
List of IBM Patents or Patent Applications Treated as Related.

* cited by examiner

COGNITIVE-BASED DRIVING ANOMALY DETECTION BASED ON SPATIO-TEMPORAL LANDSCAPE-SPECIFIC DRIVING MODELS

FIELD

The present application generally relates to information technology, and, more particularly, to ride-sharing technologies.

BACKGROUND

Carpooling (also referred to, for example, as car-sharing or ride-sharing) refers to the sharing of vehicle journeys such that more than one just person travels in a vehicle towards one or more destinations. By having multiple people using one vehicle, carpooling can reduce each person's travel costs, such as fuel cost, tolls, etc., as well as potentially reduce stress related to driving. Existing carpooling technology, however, commonly fails to account for, and/or encompass, participant variables such as, for example, driver skill with respect to various landscapes, as well as anomalous driver behavior.

SUMMARY

In one embodiment of the present invention, techniques for cognitive-based driving anomaly detection based on spatio-temporal landscape-specific driving models are provided. An exemplary computer-implemented method can include generating, for each of multiple users, a temporally-related driving skill model pertaining to one or more landscapes, wherein the temporally-related driving skill model is based on (i) one or more items of temporally-related driving data associated with the users and (ii) landscape-related information of trips driven by the users. Such a method also includes monitoring one or more of the users participating in a ride-sharing trip in a given vehicle, wherein monitoring the users comprises analyzing ride-sharing trip data comprising (i) one or more items of driver-related data from the ride-sharing trip that are associated with portions of the ride-sharing trip driven by the monitored users and (ii) one or more environmental factors relevant to the ride-sharing trip. Additionally, such a method can include detecting one or more driving-related anomalies attributed to at least one of the monitored users, wherein detecting the one or more driving-related anomalies comprises comparing (i) the analyzed ride-sharing trip data and (ii) the respective temporally-related driving skill model for each of the monitored users. Such a method can also include updating a pre-existing schedule for the ride-sharing trip based on (i) the one or more detected anomalies and (ii) one or more estimated conditions attributed to one or more remaining portions of the ride-sharing trip, wherein updating the pre-existing schedule comprises modifying an assignment of one or more selected users to drive the given vehicle during one or more of the remaining portions of the ride-sharing trip. Further, such a method includes outputting the updated schedule to at least the selected users.

In another embodiment of the invention, an exemplary computer-implemented method can include updating a pre-existing schedule for the ride-sharing trip based on (i) the one or more detected anomalies and (ii) one or more estimated conditions attributed to one or more remaining portions of the ride-sharing trip, wherein updating the pre-existing schedule includes selecting a distinct route, in comparison to the previously-selected route.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes cognitive-based driving anomaly detection based on spatio-temporal landscape-specific driving models. At least one embodiment of the invention can include updating a trip itinerary and/or a driver assignment schedule for the trip (that is, which driver will drive which segment of the trip) based on one or more anomalies detected, and/or one or more changes detected in weather conditions, traffic conditions, vehicle condition, etc., to improve passenger safety for the trip. In connection with one or more embodiments of the invention, based on a spatio-temporal landscape specific model learnt and/or established for a given driver, the given driver is expected to drive in a certain manner depending on the landscape in which the driver is driving and the amount of time for which the driver has been driving. If the driving in an ongoing trip is found to be sufficiently different from what is expected, as per the learnt model, such driving is referred to as a driving "anomaly."

One or more embodiments can include monitoring a driver profile based on landscape, weather, environmental conditions, etc., and detecting one or more anomalies in the driving pattern based on a comparison of the current driving pattern and a learnt temporal driving model built for each driver based on his or her own driving data. Additionally, at least one embodiment of the invention can include using one or more Internet of things (IoT) devices to identify driving profiles and skill sets of drivers, and to track vehicle movements (such as braking events, closeness to boundaries and other vehicles, violation of rules, etc.), user stress levels (such as via user eye blinking, user heart rate, user hand movement, etc.), and passengers opinions (speech recordings, body movements, etc.). For example, such data can be gathered from in-vehicle sensors and/or sensors resident in mobile devices (global positioning system (GPS) units, accelerometers, gyroscope sensors, etc.). Also, one or more embodiments of the invention can include using one or more online sources to identify driving profiles and skill sets of drivers. For example, such an embodiment can include tracking social media postings, online ratings and references, etc. to evaluate and/or determine skill sets of drivers. Additionally, such online sources can include unstructured data of reviews and ratings for a given trip, and one or more embodiments of the invention can include correlating such unstructured data with the driver for that trip and/or trip segment.

Based on determined user driving skills for various temporal durations and landscapes (learnt using historical trip data), at least one embodiment of the invention includes detecting if there is any spatio-temporal anomaly for the existing trip (in connection with one or more specific drivers). Based on any such detected anomalies, such an embodiment can additionally include deciding if there is a need to update the driving schedule for the trip (that is, which passenger should drive, considering spatio-temporal skills, the expected weather, landscape, traffic conditions, vehicle condition, etc.), and also if there is a need to select a modified route for rest of the trip, based on the skills of the available drivers.

In connection with such an embodiment, temporal and landscape-specific driving anomalies for a given driver can be detected based on the driving data of the current trip (including one or more environmental factors) and a learnt temporal driving skill model, for the given driver, based on the given landscape and one or more environment factors of the current trip.

Figure 1:
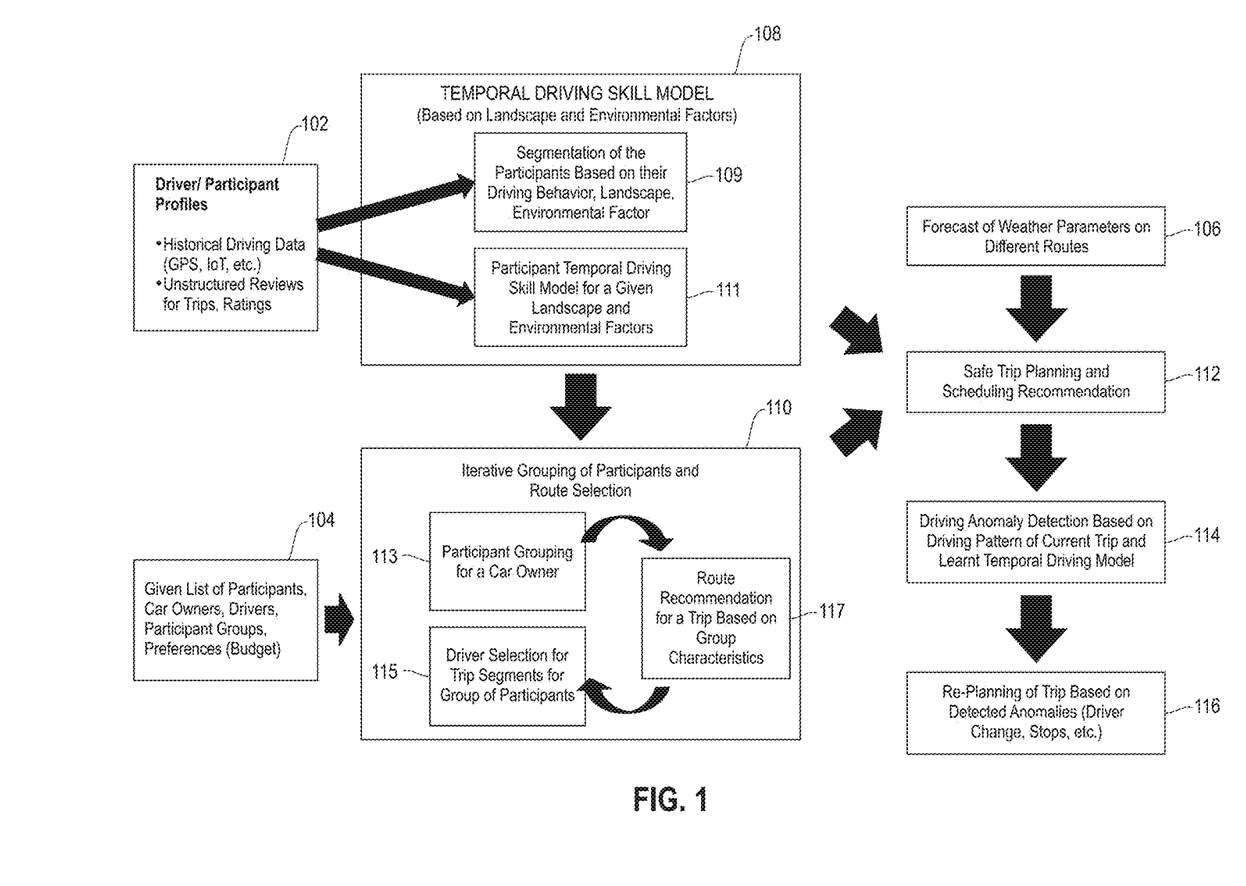
FIG. 1 is a diagram illustrating system architecture, according to an exemplary embodiment of the invention.

FIG. 1 is a diagram illustrating system architecture, according to an embodiment of the invention. By way of illustration, FIG. 1 depicts inputs that include driver/participant profiles 102, related carpooling data 104, and forecasts 106 of one or more weather parameters with respect to different routes and/or geographic areas. The driver/participant profiles 102 can include, for example, historical driving data for individuals (such as GPS data and Internet of things (IoT) data from mobile phones, instrumented vehicles, etc.), route characteristics, and unstructured review information (such as passenger ratings). Such passenger ratings can be derived, for example, from online reviews for trips, wherein passengers share their experience as well as provide overall ratings for the trip. The carpooling data 104 can include, for example, identification of participants, car owners, drivers, participant groups, user preferences (such as budgetary preferences), etc. Individuals can, for example, register themselves on carpooling websites if they are interested in ride-sharing.

FIG. 1 also depicts a temporal driving skill model generator 108. The model generator 108, based on inputs that include the driver/participant profiles 102, utilizes a participant segmentation component 109 (which segments participants based on driving behavior, landscape, and/or environmental factors) to create a participant temporal driving skill model 111 for a given landscape and a given set of one or more environmental factors.

Additionally, as depicted in FIG. 1, the generated model 111 is provided, along with the carpooling data 104, to an iterative grouping component 110, which generates a participant grouping for a car owner 113, a route recommendation for a trip 117 based on one or more group characteristics, and a driver selection for trip segments for a group of participants 115.

Further, the temporal driving skill model generator 108 and the iterative grouping component 110 provide inputs to a trip planning and scheduling recommendation component 112, which also receives the forecast data 106 as input. Component 112, based on these inputs, can then generate a detailed trip plan, for example, with driver assignments for different segments of the trip.

Using the detailed trip plan, a driving anomaly detection component 114 determines one or more anomalies in driver behavior based on driving patterns relevant to the current trip and learnt temporal driving models pertaining to the potential drivers. In one or more embodiments of the invention, driving anomaly detection component 114 can carry out an offline phase, wherein the component leverages IoT devices to identify and/or determine driving profiles (and skill-sets) of drivers. As used in this instance, the offline phase includes building driving models using data collected from IoT devices during trips undertaken in the past. An online phase would include using such data to flag one or more anomalies in a current ongoing trip. Such leveraging of IoT devices can include tracking vehicle movements (braking activity, proximity to boundaries and/or other vehicles, violation of traffic rules, etc.), tracking user/driver stress levels (via blinking of eyes, heart rate, hand movement of steering, etc.), and tracking passenger opinions (via passenger speech, body movement, etc.).

At least one embodiment of the invention can also include leveraging one or more online sources to identify, determine and/or supplement the driving profiles (and skill-set) of drivers. Such leveraging of online sources can include tracking social media/network posts, online ratings, online references, photos, etc. to determine a skill set of drivers. Additionally, such an embodiment can also include tracking languages known to users, familiarity with one or more particular destinations, etc. By way of example, one or more embodiments can include selecting a user to drive for a given segment of trip if the user has already driven on certain roads, has shown sufficient skill, and also knows a local language to understand sign-boards, etc.

Based on the detected anomalies generated by detection component 114, a trip re-planning component 116 can generate an updated trip plan. In at least one embodiment of the invention, the re-planning component 116 can perform periodic and/or continuous monitoring of the current driving profile of each potential driver (for the trip) based on the changing landscape during the trip as well as one or more weather and/or environmental conditions. Based on such monitoring and any detected driving anomaly (as well as the original trip plan generated by component 112), the re-planning component 116 can generate and output a dynamic route update and/or a driver-rescheduling for the trip.

Figure 2:
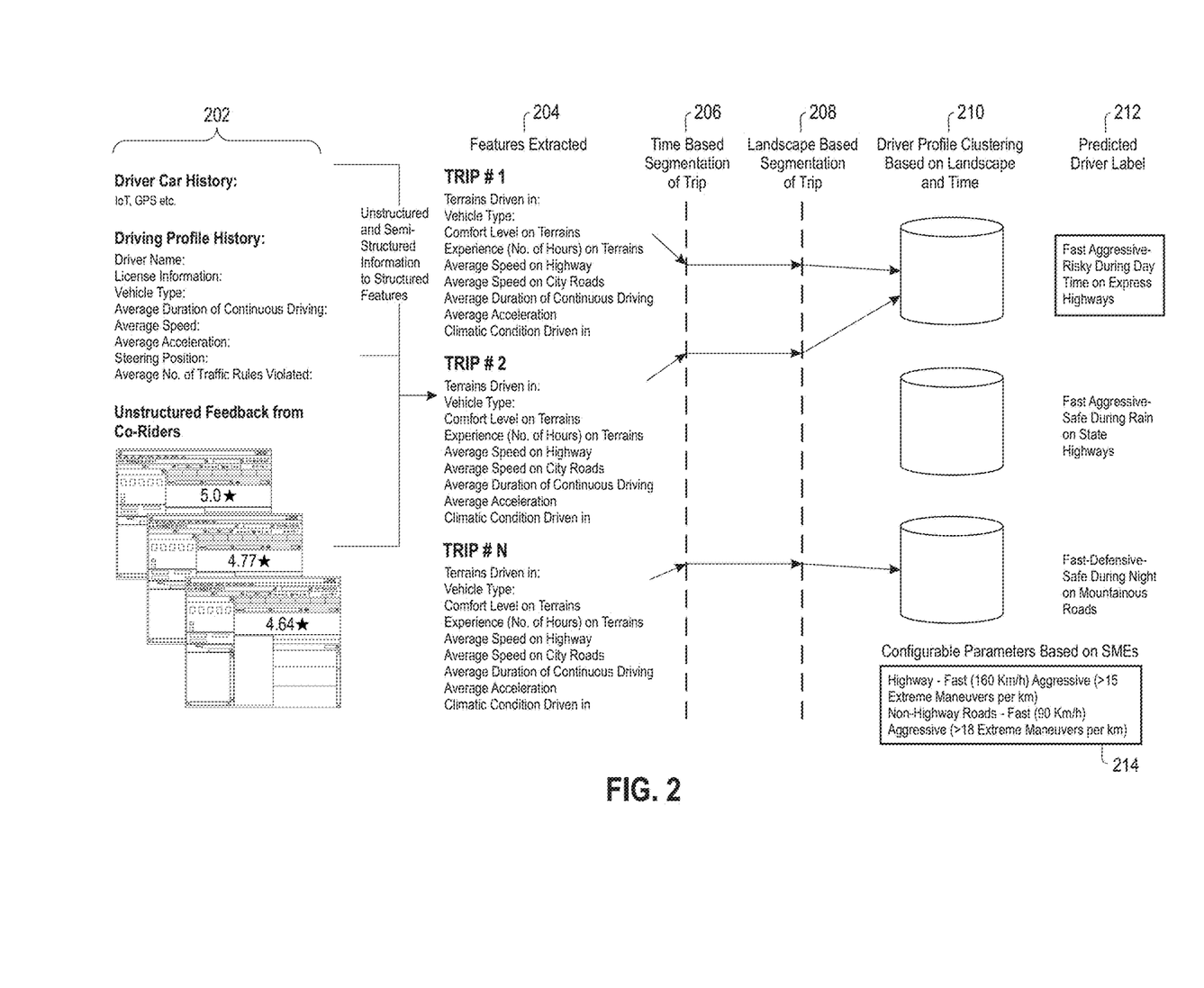
FIG. 2 is a diagram illustrating segmentation of drivers, according to an exemplary embodiment of the invention.

FIG. 2 is a diagram illustrating segmentation of drivers, according to an exemplary embodiment of the invention. As detailed herein, at least one embodiment of the invention includes clustering drivers into groups based on driving data, landscapes and environmental factors. By way of illustration, FIG. 2 depicts inputs 202 including driver and vehicle history data, driver profiles (with data pertaining to speed, acceleration, steering position, etc.), and unstructured feedback (such as safety reviews, for example) from passengers and/or co-riders. The unstructured and semi-structured information derived from inputs 202 can then be utilized to generate structured features 204, which can be broken down by trip. Each such trip can then be segmented based on time (as shown via component 206) and on landscape (as shown via component 208).

The trips (for each driver) can then be clustered into groups 210 for given landscapes and time parameters using features 204 such as trip speed quantiles, acceleration quantiles, steering position, user ratings, features extracted from reviews, etc. Additionally, one or more embodiments of the invention can include determining a (predictive) label 212 to be applied to each driver for the different landscapes and time parameters. Such labels can be generated, for example, based on the clusters containing the largest number of trips. Also, such labels can include, for example, fast-aggressive-risky during the day on highways, fast-aggressive-safe during periods of rain on highways, fast-defensive-safe during the night on mountainous roads, etc. In distinguishing between various driver qualifiers (such as "risky" driving versus "safe" driving, "aggressive" driving versus "defensive" driving, etc.), at least one embodiment of the invention can include implementing configurable parameters 214. Such configurable parameters 214 can include setting a threshold speed value denoting a designation of "fast," as well as a threshold number of extreme maneuvers (per a given distance) denoting a designation of "aggressive."

Figure 3:
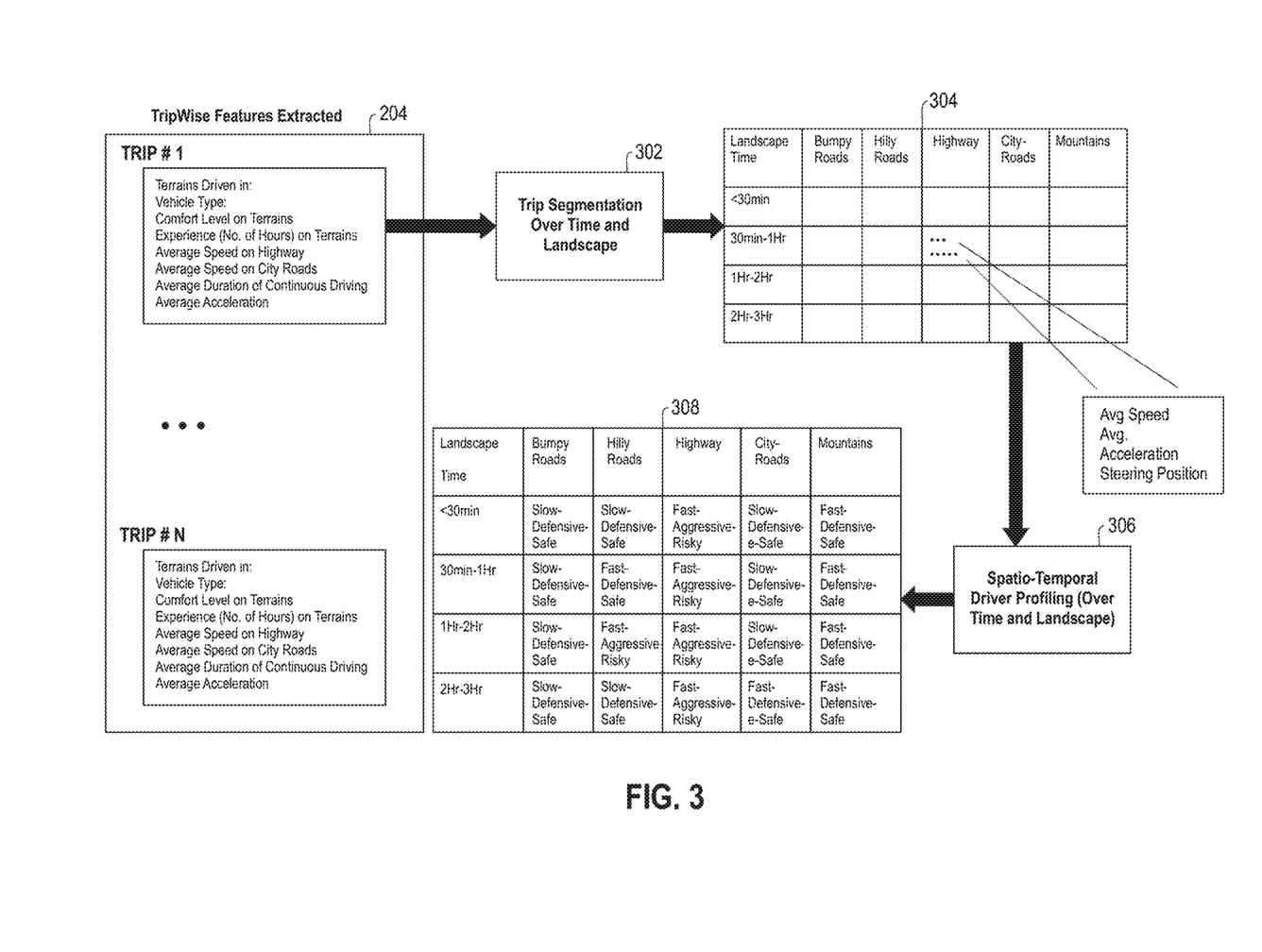
FIG. 3 is a diagram illustrating driving anomaly detection, according to an exemplary embodiment of the invention.

FIG. 3 is a diagram illustrating driving anomaly detection, according to an exemplary embodiment of the invention. As detailed above and further herein, at least one embodiment of the invention includes generating a temporal driving skill model for a given driver with respect to landscapes and/or one or more environmental factors. By way of illustration, FIG. 3 depicts extracted features 204 (such as detailed above), which are utilized to segment all trips of a given driver 302 based on time parameters and landscapes (similar to components 206 and 208 in FIG. 2, as described above).

Also, in furtherance of the segmentation process 302, table 304 can be generated (and ultimately populated). For example, for each type of given landscape, and across all trips for a particular driver, table 304 can breakdown the trips into different parts based on the elapsed time (for example, (i) less than 30 minutes (min), (ii) 30 min-1 hour (hr), (iii) 1 hr-2 hr, and (iv) 2 hr-3 hr). Further, for each of those different parts, profiling component 306 can construct a feature profile (using speed, acceleration, steering position, etc.) and map the profile to an associated cluster (such as depicted via component 210 in FIG. 2), thereby generating table 308. Also, for a given driver, at least one embodiment of the invention can include denoting if there is a change in the mapped cluster for different parts of a trip. For example, for an initial part of a trip, the driver may be classified as "Slow-Defensive-Safe," but then the driver may subsequently be classified as "Fast-Defensive-Safe," and after 1 hour, the driver may be classified as "Fast-Aggressive-Risky."

Figure 4:
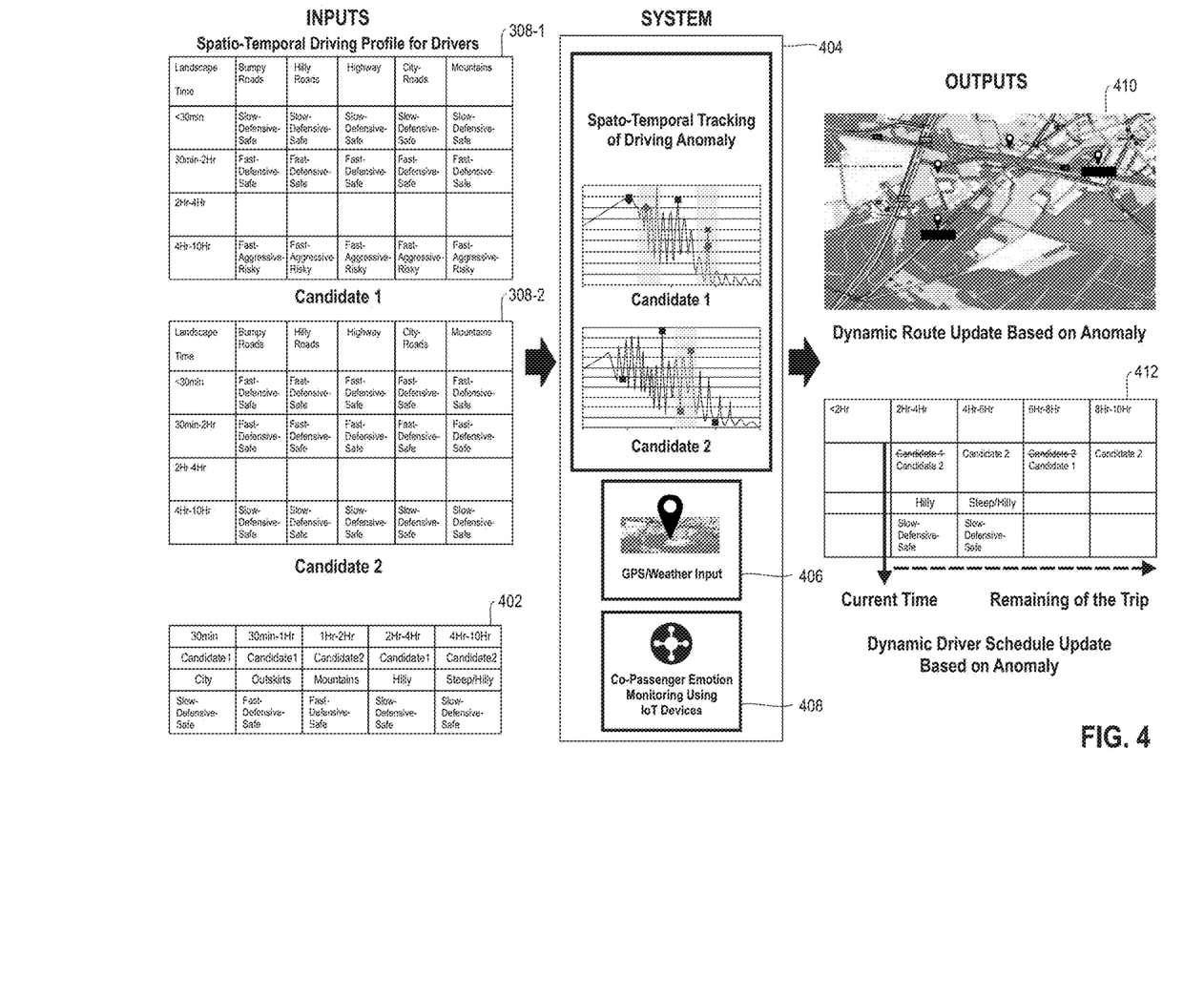
FIG. 4 is a diagram illustrating trip and driver scheduling, according to an exemplary embodiment of the invention.

FIG. 4 is a diagram illustrating trip and driver scheduling, according to an exemplary embodiment of the invention. By way of illustration, FIG. 4 depicts inputs that include driver data tables 308-1 and 308-2 (collectively, 308) corresponding candidate driver 1 and candidate driver 2, respectively, related to the given trip. Also, additional inputs can include a schedule 402 that includes assignments of drivers/users to each of one or more blocks of time for the trip.

Using the driver data tables 308 and the schedule 402, as well as GPS and/or weather input 406 and co-passenger emotion monitoring data (derived via one or more IoT devices) 408, a spatio-temporal driving anomaly tracking component 404 can generate outputs that include a dynamic route update 410 based on one or more of the detected/tracked anomalies (such as, for example, an indication that a given driver drives slower than usual on a given landscape during a given time of day), and a dynamic driver schedule update 412 based on one or more of the detected/tracked anomalies.

Given, for each driver of a trip, assignment of the driver to one or more driver profile clusters and labels for the driver for different landscapes, at least one embodiment of the invention can include detecting one or more anomalies in real-time for the current trip. During the trip, such an embodiment includes continuously updating the driving profile for each driver, with respect to the trip. Additionally, such an embodiment includes assigning the continuously updated (current) driving profiles to the pre-determined driver profile clusters. Further, such an embodiment can include flagging and/or identifying an anomaly if the current profile is assigned to a cluster which is not a match and/or a reasonable representative of the relevant driver skill label.

In connection with real-time updating of driver profiles and cluster assignment processes, at least one embodiment of the invention can include continuously monitoring (and updating a relevant profile), during a given trip, the manner in which a driver is driving. The profile, which is being revised as additional data for the trip are being processed, can be used to assign the drive to one or more pre-determined driver profile clusters based on how similar the profile is to profiles in the clusters. Also, if the updated profile is assigned to a cluster which is sufficiently different from the representative clusters for the given driver based on his or her historical driving data, then the profile is flagged as an anomaly.

As also illustrated in FIG. 4 via outputs 410 and 412, at least one embodiment of the invention includes dynamically updating a driving schedule and trip route based on one or more detected driver anomalies and/or one or more changes in weather or traffic conditions. One or more embodiments of the invention can include continuously monitoring to determine whether one or more of the following situations arises: a driver anomaly is detected, a (significant) change in a weather forecast is observed, a real-time traffic condition change is observed on one or more routes pertaining to the trip, and a change in a vehicle condition is detected and/or observed. If one or more of those situations is determined to arise, then such an embodiment includes jointly optimizing the driving schedule and trip route selection based on one or more identified user/driver constraints (such as, for example, slow driving in a mountainous section, fast-defensive driving in a flat-road section, etc.), available time, etc. Such constraints can be identified and/or learned based on the driver's historical driving data (and can be incorporated as part of the spatio-temporal driving skill model of the driver).

Additionally, at least one embodiment of the invention can include identifying all available routes for the given/current trip. Such an embodiment additionally includes filtering one or more of the available routes based on the current traffic conditions, the current vehicle condition, and one or more user/driver constraints. For each of the remaining routes, one or more embodiments can include dividing the route into different segments based on the landscape corresponding to each segment, the temporal value of the segment within the trip, and a revised set of weather conditions relevant to the segment. For example, consider a trip divided into the following four segments: (i) 50 kilometers (km) of highway (daytime, heavy rain); (ii) 100 km of highway (night-time, moderate rain); (iii) 20 km of mountainous roads (night-time, dry); and (iv) 20 km of city driving (early morning, fog).

For each segment, at least one embodiment of the invention can include selecting one or more of the potential drivers (for the trip) to drive based on the corresponding driver landscape-based skills, driver temporal driving skills, and information pertaining to the partially-completed trip (such as, for example, who drove which segment, to determine the current driving load for each passenger). Such an embodiment can then determine and/or select an updated/ improved route and driving schedule based on the selected driver(s), one or more user preferences, and one or more user constraints.

Figure 5:
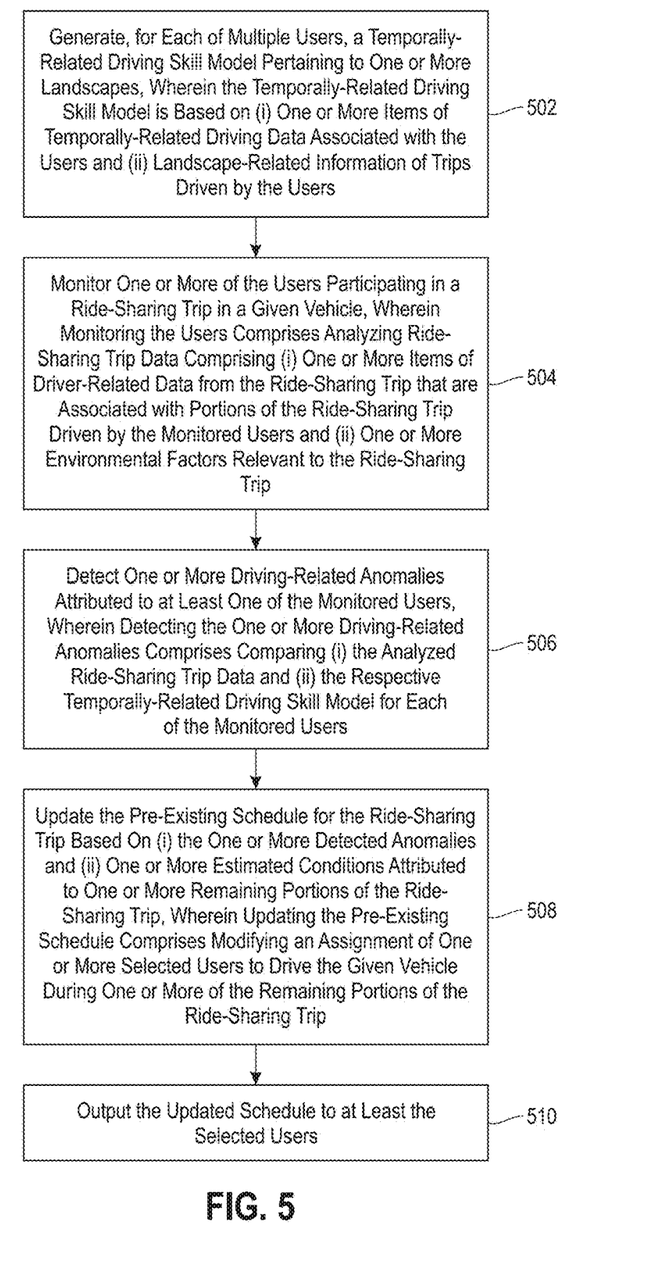
FIG. 5 is a flow diagram illustrating techniques according to an embodiment of the invention.

FIG. 5 is a flow diagram illustrating techniques according to an embodiment of the present invention. Step 502 includes generating, for each of multiple users, a temporally-related driving skill model pertaining to one or more landscapes, wherein the temporally-related driving skill model is based on (i) one or more items of temporally-related driving data associated with the users and (ii) landscape-related information of trips driven by the users.

Step 504 includes monitoring one or more of the users participating in a ride-sharing trip in a given vehicle, wherein monitoring the users comprises analyzing ride-sharing trip data comprising (i) one or more items of driver-related data from the ride-sharing trip that are associated with portions of the ride-sharing trip driven by the monitored users and (ii) one or more environmental factors relevant to the ride-sharing trip. The one or more items of driver-related data can include global positioning system data and/or Internet of things data.

Step 506 includes detecting one or more driving-related anomalies attributed to at least one of the monitored users, wherein detecting the one or more driving-related anomalies comprises comparing (i) the analyzed ride-sharing trip data and (ii) the respective temporally-related driving skill model for each of the monitored users.

Step 508 includes updating a pre-existing schedule for the ride-sharing trip based on (i) the one or more detected anomalies and (ii) one or more estimated conditions attributed to one or more remaining portions of the ride-sharing trip, wherein updating the pre-existing schedule comprises modifying an assignment of one or more selected users to drive the given vehicle during one or more of the remaining portions of the ride-sharing trip. The estimated conditions can include one or more estimated weather conditions, one or more estimated landscape conditions, one or more estimated traffic conditions, and/or one or more estimated conditions attributed to the given vehicle.

Also, in one or more embodiments of the invention, updating the pre-existing schedule can include selecting a distinct route, in comparison to the previously-selected route, for the ride-sharing trip based on the one or more detected anomalies and one or more environmental factors relevant to the ride-sharing trip. The environmental factors can include one or more landscapes associated with portions of the ride-sharing trip driven by the monitored users. Additionally, updating the pre-existing schedule for the ride-sharing trip can be further based on one or more user constraints associated with one or more of the users participating in the ride-sharing trip.

Step 510 includes outputting the updated schedule to at least the selected users.

Also, an additional embodiment of the invention includes updating a pre-existing schedule for the ride-sharing trip based on (i) the one or more detected anomalies and (ii) one or more estimated conditions attributed to one or more remaining portions of the ride-sharing trip, wherein updating the pre-existing schedule includes selecting a distinct route, in comparison to the previously-selected route.

At least one embodiment of the invention (such as the techniques depicted in FIG. 5, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives driver skill and trip information sent from a data source to the transmission server. The server can process the information, for example, based upon user-provided user preference information that is stored in memory on the server. Subsequently, an alert is generated containing the recommended trip route and driver schedule. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
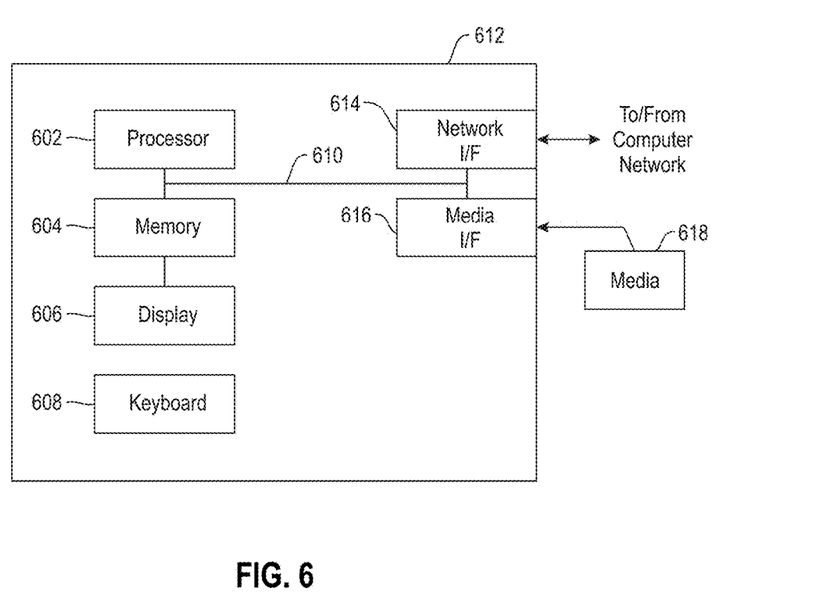
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
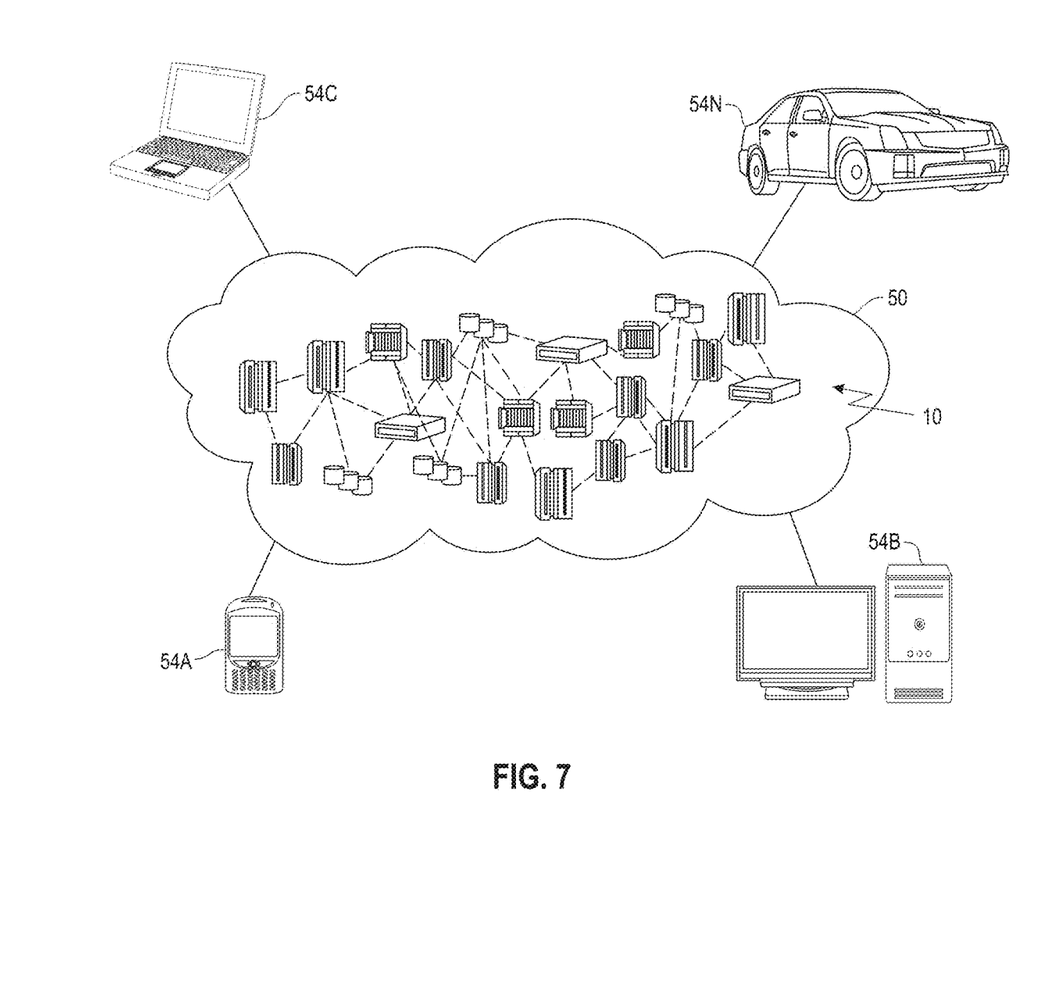
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
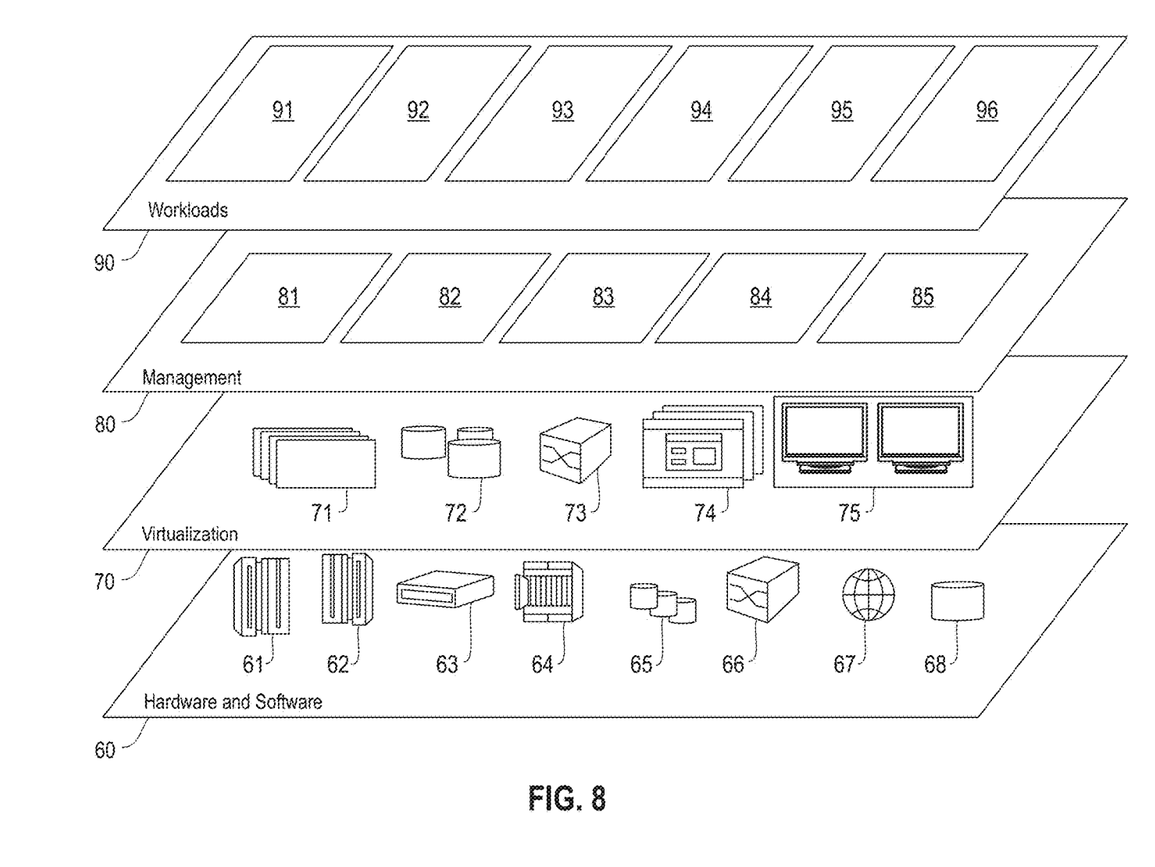
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trip and driver re-scheduling 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, leveraging user driving and temporal skills for different landscapes to dynamically update a landscape-based driving schedule and trip route.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising steps of:
generating, for each of multiple users, a temporally-related driving skill model pertaining to one or more landscapes, wherein the temporally-related driving skill model is based on (i) one or more items of temporally-related driving data associated with the users and (ii) landscape-related information of trips driven by the users;
monitoring one or more of the multiple users who are participating in a ride-sharing trip in a given vehicle, wherein said monitoring the users comprises analyzing ride-sharing trip data comprising (i) one or more items of driver-related data from the ride-sharing trip that are associated with portions of the ride-sharing trip driven by the monitored users and (ii) one or more environmental factors relevant to the ride-sharing trip;
detecting one or more driving-related anomalies attributed to at least one of the monitored users, wherein said detecting the one or more driving-related anomalies comprises comparing (i) the analyzed ride-sharing trip data and (ii) a respective temporally-related driving skill model for each of the monitored users;
updating a pre-existing schedule for the ride-sharing trip based on (i) the one or more detected anomalies and (ii) one or more estimated conditions attributed to one or more remaining portions of the ride-sharing trip, wherein said updating the pre-existing schedule comprises modifying an assignment of one or more of the users participating in the ride-sharing trip to drive the given vehicle during one or more of the remaining portions of the ride-sharing trip; and
outputting the updated schedule to at least the selected users;
wherein the steps are carried out by at least one computing device.

2. The computer-implemented method of claim 1, wherein said updating the pre-existing schedule comprises selecting a distinct route, in comparison to the previously-selected route, for the ride-sharing trip based on (i) the one or more detected anomalies and (ii) the one or more environmental factors relevant to the ride-sharing trip.

3. The computer-implemented method of claim 1, wherein the one or more estimated conditions comprise one or more estimated weather conditions.

4. The computer-implemented method of claim 1, wherein the one or more estimated conditions comprise one or more estimated landscape conditions.

5. The computer-implemented method of claim 1, wherein the one or more estimated conditions comprise one or more estimated traffic conditions.

6. The computer-implemented method of claim 1, wherein the one or more estimated conditions comprise one or more estimated conditions attributed to the given vehicle.

7. The computer-implemented method of claim 1, wherein the one or more items of driver-related data comprise global positioning system data.

8. The computer-implemented method of claim 1, wherein the one or more items of driver-related data comprise Internet of things data.

9. The computer-implemented method of claim 1, wherein said updating the pre-existing schedule for the ride-sharing trip is based on one or more user constraints associated with one or more of the users participating in the ride-sharing trip.

10. The computer-implemented method of claim 1, wherein the one or more environmental factors comprise one or more landscapes associated with portions of the ride-sharing trip driven by the monitored users.

11. A computer program product comprising a non-transitory computer readable storage medium having program instructions embodied therewith, the program instructions executable by a device to cause the device to:
generate, for each of multiple users, a temporally-related driving skill model pertaining to one or more landscapes, wherein the temporally-related driving skill model is based on (i) one or more items of temporally-related driving data associated with the users and (ii) landscape-related information of trips driven by the users;
monitor one or more of the multiple users who are participating in a ride-sharing trip in a given vehicle, wherein said monitoring the users comprises analyzing ride-sharing trip data comprising (i) one or more items of driver-related data from the ride-sharing trip that are associated with portions of the ride-sharing trip driven by the monitored users and (ii) one or more environmental factors relevant to the ride-sharing trip;
detect one or more driving-related anomalies attributed to at least one of the monitored users, wherein said detecting the one or more driving-related anomalies comprises comparing (i) the analyzed ride-sharing trip data and (ii) a respective temporally-related driving skill model for each of the monitored users;
update a pre-existing schedule for the ride-sharing trip based on (i) the one or more detected anomalies and (ii) one or more estimated conditions attributed to one or more remaining portions of the ride-sharing trip, wherein said updating the pre-existing schedule comprises modifying an assignment of one or more of the users participating in the ride-sharing trip to drive the given vehicle during one or more of the remaining portions of the ride-sharing trip; and
output the updated schedule to at least the selected users.

12. The computer program product of claim 11, wherein said updating the pre-existing schedule comprises selecting a distinct route, in comparison to the previously-selected route, for the ride-sharing trip based on (i) the one or more detected anomalies and (ii) the one or more environmental factors relevant to the ride-sharing trip.

13. The computer program product of claim 11, wherein the one or more estimated conditions comprise at least one of (i) one or more estimated weather conditions, (ii) one or more estimated landscape conditions, (iii) one or more estimated traffic conditions, and (iv) one or more estimated conditions attributed to the given vehicle.

14. The computer program product of claim 11, wherein the one or more items of driver-related data comprise global positioning system data and Internet of things data.

15. A system comprising:
a memory; and
at least one processor coupled to the memory and configured for:
generating, for each of multiple users, a temporally-related driving skill model pertaining to one or more landscapes, wherein the temporally-related driving skill model is based on (i) one or more items of temporally-related driving data associated with the users and (ii) landscape-related information of trips driven by the users;
monitoring one or more of the multiple users who are participating in a ride-sharing trip in a given vehicle, wherein said monitoring the users comprises analyzing ride-sharing trip data comprising (i) one or more items of driver-related data from the ride-sharing trip that are associated with portions of the ride-sharing trip driven by the monitored users and (ii) one or more environmental factors relevant to the ride-sharing trip;
detecting one or more driving-related anomalies attributed to at least one of the monitored users, wherein said detecting the one or more driving-related anomalies comprises comparing (i) the analyzed ride-sharing trip data and (ii) a respective temporally-related driving skill model for each of the monitored users;
updating a pre-existing schedule for the ride-sharing trip based on (i) the one or more detected anomalies and (ii) one or more estimated conditions attributed to one or more remaining portions of the ride-sharing trip, wherein said updating the pre-existing schedule comprises modifying an assignment of one or more of the users participating in the ride-sharing trip to drive the given vehicle during one or more of the remaining portions of the ride-sharing trip; and
outputting the updated schedule to at least the selected users.

16. A computer-implemented method, comprising steps of:
generating, for each of multiple users, a temporally-related driving skill model pertaining to one or more landscapes, wherein the temporally-related driving skill model is based on (i) one or more items of temporally-related driving data associated with the users and (ii) landscape-related information of trips driven by the users;
monitoring one or more of the multiple users who are participating in a ride-sharing trip in a given vehicle, wherein said monitoring the users comprises analyzing ride-sharing trip data comprising (i) one or more items of driver-related data from the ride-sharing trip that are associated with portions of the ride-sharing trip driven by the monitored users and (ii) one or more environmental factors relevant to the ride-sharing trip;
detecting one or more driving-related anomalies attributed to at least one of the monitored users, wherein said detecting the one or more driving-related anomalies comprises comparing (i) the analyzed ride-sharing trip data and (ii) a respective temporally-related driving skill model for each of the monitored users;
updating a pre-existing schedule for the ride-sharing trip based on (i) the one or more detected anomalies and (ii) one or more estimated conditions attributed to one or more remaining portions of the ride-sharing trip, wherein said updating the pre-existing schedule comprises selecting a distinct route, in comparison to the previously-selected route; and
outputting the updated schedule to at least the selected users;
wherein the steps are carried out by at least one computing device.

17. The computer-implemented method of claim 16, wherein said updating the pre-existing schedule comprises modifying an assignment of one or more of the users participating in the ride-sharing trip to drive the given vehicle during one or more of the remaining portions of the ride-sharing trip.

18. The computer-implemented method of claim 16, wherein the one or more estimated conditions comprises one or more estimated weather conditions.

19. The computer-implemented method of claim 16, wherein the one or more estimated conditions comprises one or more estimated landscape conditions.

20. The computer-implemented method of claim 16, wherein the one or more estimated conditions comprises one or more estimated traffic conditions.

* * * * *